(12) United States Patent
Chen et al.

(10) Patent No.: US 9,774,238 B2
(45) Date of Patent: Sep. 26, 2017

(54) LINEAR MOTOR

(71) Applicant: HON HAI PRECISION INDUSTRY CO., LTD., New Taipei (TW)

(72) Inventors: Po-Kuang Chen, New Taipei (TW); Chang-Sheng Wang, New Taipei (TW); Mi-Chien Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 186 days.

(21) Appl. No.: 14/687,328

(22) Filed: Apr. 15, 2015

(65) Prior Publication Data

US 2016/0118871 A1 Apr. 28, 2016

(30) Foreign Application Priority Data

Oct. 22, 2014 (TW) .............................. 103136394 A

(51) Int. Cl.
*H02K 41/00* (2006.01)
*H02K 41/03* (2006.01)
*H02K 5/173* (2006.01)
*H02K 7/08* (2006.01)

(52) U.S. Cl.
CPC ........... *H02K 41/031* (2013.01); *H02K 5/173* (2013.01); *H02K 7/08* (2013.01)

(58) Field of Classification Search
CPC .......... H02K 41/02; H02K 41/03; H02K 9/19; H02K 5/20
USPC ............................................. 310/12.29, 12.16
See application file for complete search history.

(56) References Cited

U.S. PATENT DOCUMENTS

| | | | | |
|---|---|---|---|---|
| 6,469,406 B1 * | 10/2002 | Hwang | ................ | H02K 41/031 310/12.27 |
| 7,235,902 B2 * | 6/2007 | Desailly | ............... | H02K 41/031 310/12.29 |
| 9,065,311 B2 * | 6/2015 | Chang | .................. | H02K 41/031 |
| 2006/0232141 A1 * | 10/2006 | Teramachi | ............ | F16C 29/063 310/12.21 |
| 2009/0278412 A1 * | 11/2009 | Kimura | .................. | H02K 41/03 310/28 |

* cited by examiner

*Primary Examiner* — Hanh Nguyen
*Assistant Examiner* — Leda Pham
(74) *Attorney, Agent, or Firm* — Steven Reiss

(57) ABSTRACT

A linear motor includes a stator and a rotor. The stator includes two opposing plates, a spacing plate positioned between the plates, and a plurality of permanent magnets mounted on the two plates and spaced from each other. The rotor includes a coil portion and an assembly block. The coil portion is positioned between the two plates, and the assembly block is connected to the coil portion and next to the plates. The spacing plate defines a slide groove, and the coil portion includes a plurality of balls mounted at one surface toward the spacing plate. The plurality of balls is partially received in the slide groove in the sliding way.

10 Claims, 5 Drawing Sheets

LINEAR MOTOR

FIELD

The subject matter herein generally relates to a linear motor.

BACKGROUND

Linear motors are increasingly used in semiconductor manufacturing process and automation process. A conventional linear motor includes a stator and a rotor. To insure proper operation of the linear motor, a specified air gap must be maintained between the stator and rotor. If the stator and the rotor come in contact with each other, a short circuit may be caused. Furthermore, a small constant air gap increases efficiency as well. Thus, maintaining a constant air gap is of utmost importance.

BRIEF DESCRIPTION OF THE DRAWINGS

Implementations of the present technology will now be described, by way of example only, with reference to the attached figures.

DETAILED DESCRIPTION

Figure 1:
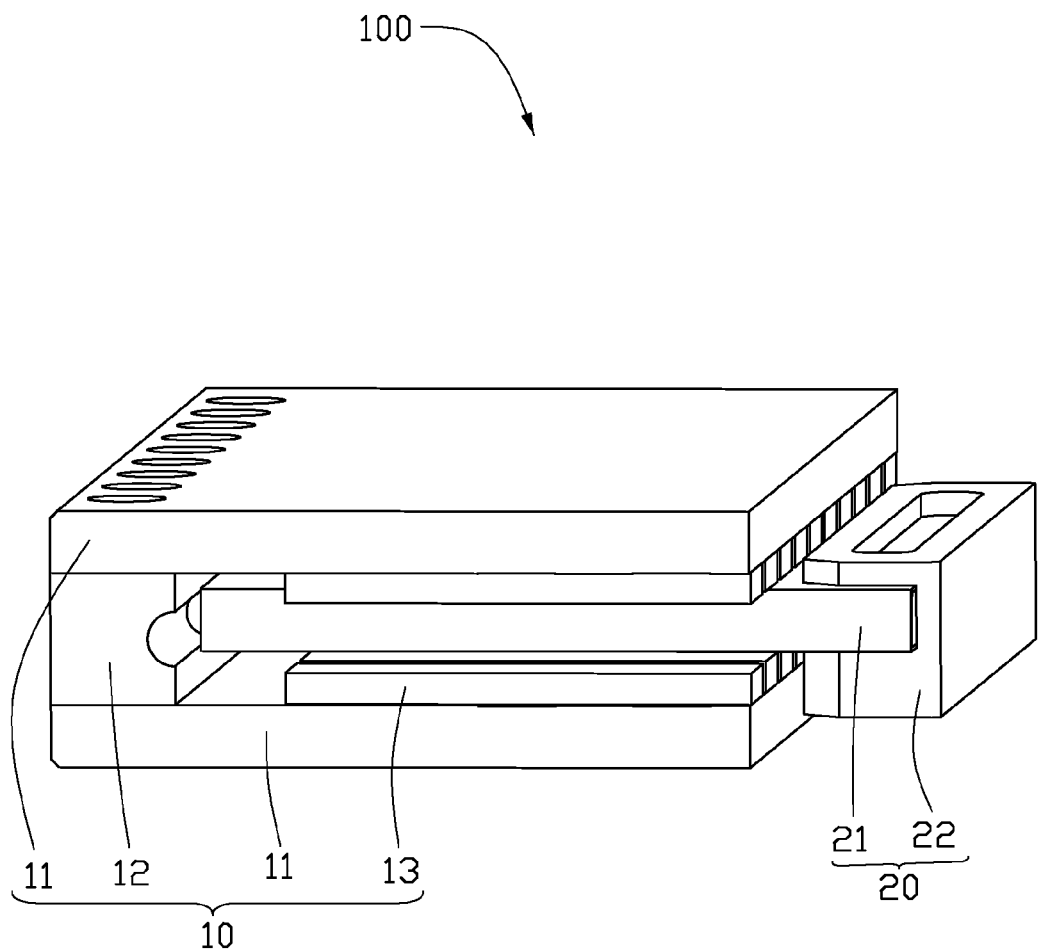
FIG. 1 is an isometric view of one embodiment of a linear motor.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a linear motor.

FIG. 1 illustrates that a linear motor 100 can include a stator 10 and a rotor 20. The stator 10 can include two plates 11 substantially parallel with each other, a spacing plate 12 sandwiched between the two plates 11, and a plurality of permanent magnets 13. The plates 11 can be substantially rectangular flat plates. The spacing plate 12 can be substantially strip shaped and positioned at same sides of the two plates 11. The plurality of the permanent magnets 13 can be spaced from each other and mounted at two facing/neighboring surfaces of the two plates 11. The plurality of permanent magnets 13 can be arranged evenly spaced on the two plates 11. The polarities of the permanent magnets 13 on each plate 11 are alternative. The polarities of the opposing permanent magnets 13 on the two plates 11 are same. The permanent magnets 13 can form a magnetic field.

The rotor 20 can include a coil portion 21 and an assembly block 22. The coil portion 21 can include a plurality of coils (not shown) arranged therein. The assembly block 22 can be substantially strip shaped and positioned outside of the stator 10 and next to the plates 11. One end of the coil portion 21 can be mounted in the assembly block 22, and other part of the main body 21 can be positioned between the two plates 11 of the stator 10. When the coils are turned on, the coil portion 21 can move along a direction parallel to the spacing plate 12 relative to the stator 10.

Figure 2:
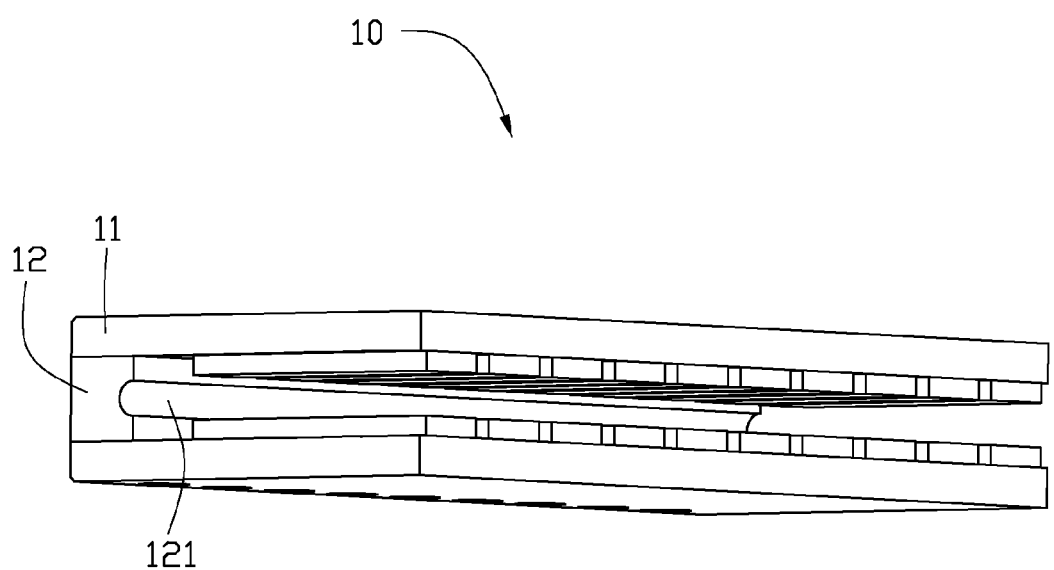
FIG. 2 is an isometric view of a stator of the linear motor in FIG. 1.

FIG. 2 illustrates that the spacing plate 12 can be substantially strip shaped and include a slide groove 121 in the central portion. In at least one embodiment, the slide groove 121 can extend along a direction substantially parallel to the plate 11. A length of the slide groove 121 can be substantially same with a length of the spacing plate 12. A bottom surface of the slide groove 121 can be substantially semicircle. In other embodiments, the position of the slide groove 121 can be depend on the predetermined air gap.

Figure 3:
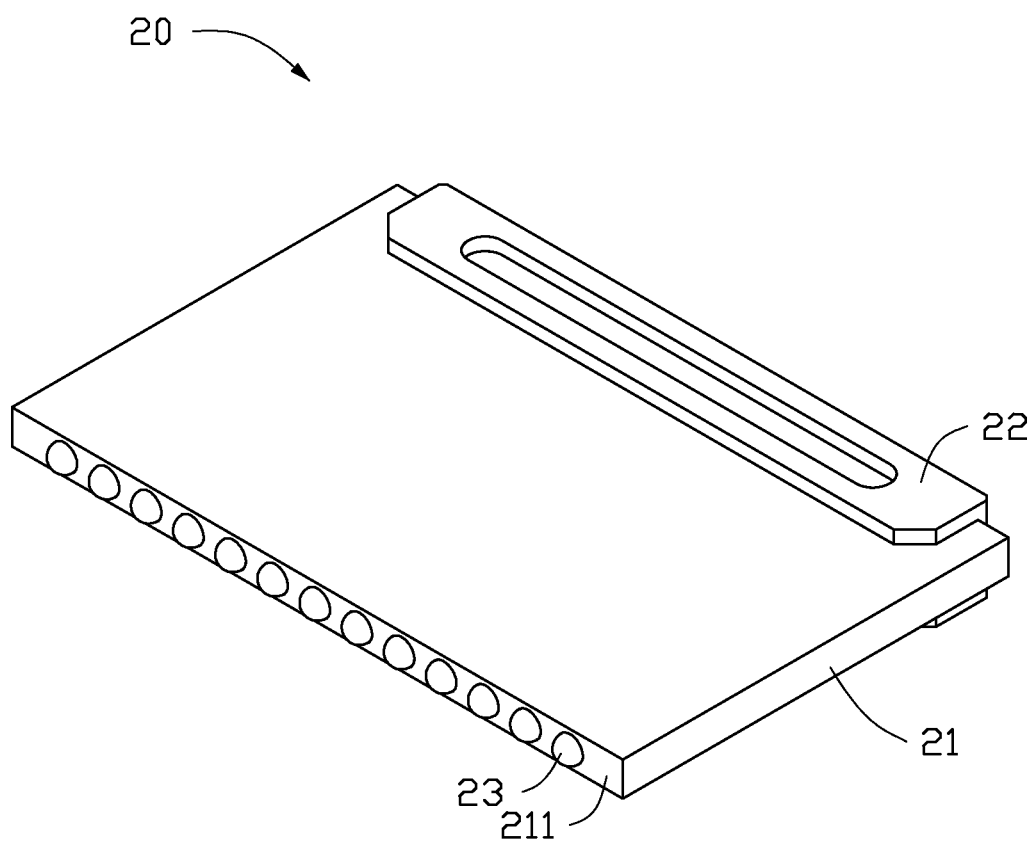
FIG. 3 is an isometric view of a rotor of the linear motor in FIG. 1.

FIG. 3 illustrates that the coil portion 21 can be substantially plate shaped, and the rotor 20 can further include a plurality of balls 23 mounted at a surface 211 of the coil portion 21 away from the assembly block 22. The surface 211 can face to the spacing plate 12. Each of the balls 23 can be partially received in the coil portion 21 and partially protrude from the surface 211 of the coil portion 21. The balls 23 can be spherical. In at least one embodiment, the balls 23 can be evenly spaced from each other. The balls 23 can be steel balls.

Figure 4:
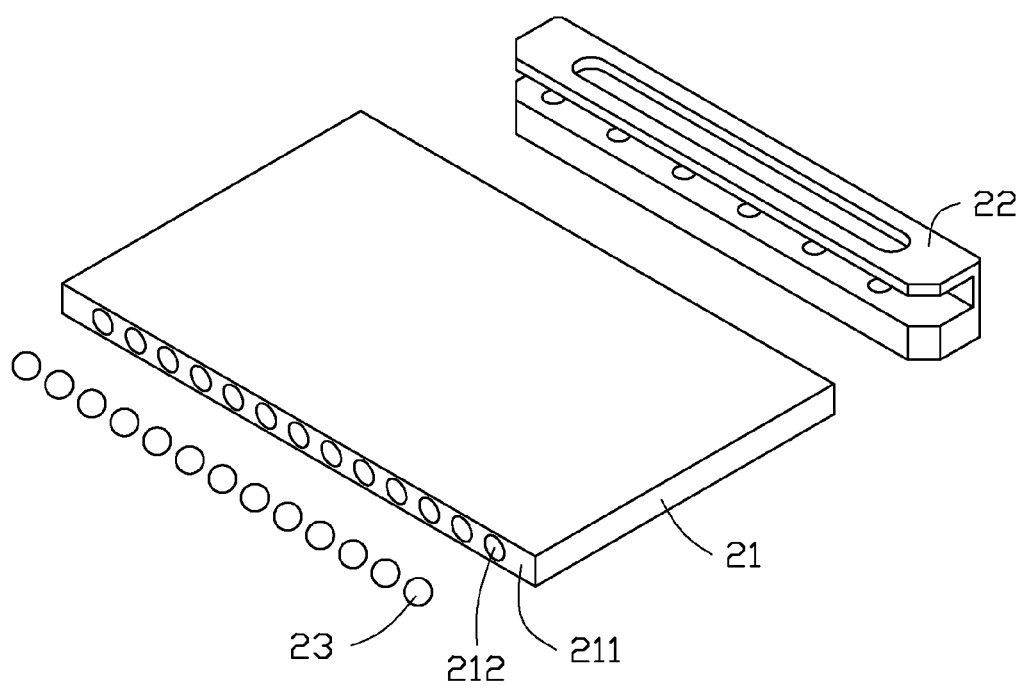
FIG. 4 is an exploded view of the rotor of FIG. 3.

FIG. 4 illustrates that the surface 211 of the coil portion 21 can define a plurality of receive holes 212. A shape and a size of receive holes 212 can match to the balls 23, and each of the balls 23 can be received in the corresponding receive holes 23. In at least one embodiment, the receive holes 212 can be circular holes.

Figure 5:
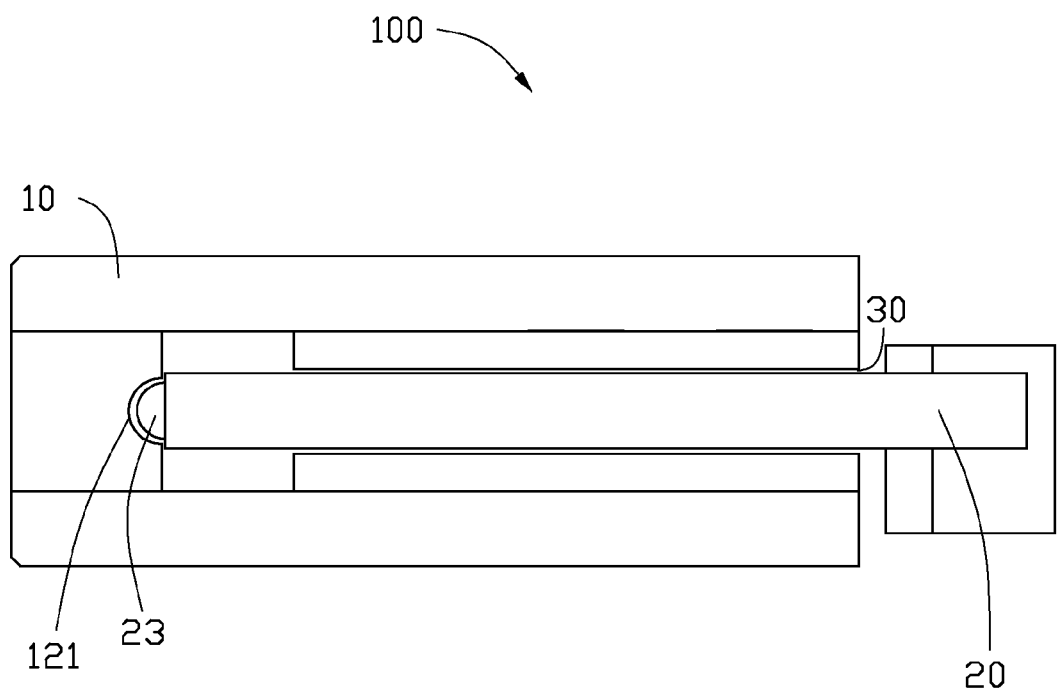
FIG. 5 is a side view of the linear motor in FIG. 1.

FIG. 5 illustrates that an air gap 30 can be formed between the stator 10 and the rotor 20. The balls 23 of the rotor 20 can be partially received in the slide groove 121 of the stator 10 in a sliding way, and can roll in the slide groove 121. Therefore, when the rotor 20 is move, the balls 23 can slide in the slide groove 121, and the air gap 30 would be stable.

In assembly, the slide groove 121 can be defined in the spacing plate 12. The permanent magnets 13 can be mounted at the plates 11, and the number of the permanent magnets 13 on the two plates 11 can be same. Then the two plate 11 can be connected to the spacing plate 12, and the stator 10 can be assembled. The coils of the stator 20 can be arranged in a line and deposited in a molding frame (not shown), then the coil portion 21 can be formed by insert molding method. The coils can be received in the coil portion 21, and the plurality of receive holes 212 on the surface 211 can be formed at the same time. The balls 23 can be received in the receive holes 212. Then, one end of the coil portion 21 can be fixed at the assembly block 22, and the other end of the coil portion 21 can be inserted between the plates 11. The balls 23 can be partially received in the slide groove 121. In at least one embodiment, the coil portion 21 can be made of epoxy resin, so the receive holes 212 can be integrally formed with the coil portion 21.

In use, when the stator 20 moves relative to the stator 10, and the balls 23 can slide in the slide groove 121. Therefore, the air gap 30 between the stator 10 and the rotor 20 can be stable.

In other embodiments, the two plates 11 can be integrally formed with the spacing plate 12.

In other embodiments, the balls 23 can be substantially cylinder shaped, as long as the balls 23 can slide in the slide groove 121.

In other embodiments, the plates 11 and the spacing plate 12 can be column shaped.

The linear motor 100 can include the rotor and the stator, the stator can define the slide groove 121. The stator can include the plurality of balls 23, and the balls 23 can slide in the slide groove 121. Therefore, the air gap between the stator 10 and the rotor 20 can be stable, and the linear motor 100 can be stable.

The embodiments shown and described above are only examples. Many details are often found in the art such as the other features of a linear motor. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A linear motor comprising:
   a stator having two plates positioned to face each other, a spacing plate positioned between the plates, and a plurality of permanent magnets mounted on the two plates, and the permanent magnets mounted on the two plates being facing each other; and
   a rotor having a coil portion positioned between the two plates, and an assembly block connected to the coil portion and adjacent to the plates;
   wherein the spacing plate defines a slide groove, a bottom surface of the slide groove is a semicircle, the coil portion comprises a plurality of balls, and the plurality of balls is mounted at one surface of the coil portion toward the bottom surface of the slide groove of the spacing plate and away from the assembly block; and
   wherein the plurality of balls is partially received in the slide groove in a sliding way to keep a gap between the stator and the rotor.

2. The linear motor as claimed in claim 1, wherein the slide groove extends along a direction substantially parallel to the plates.

3. The linear motor as claimed in claim 1, wherein a length of the slide groove is substantially same with a length of the spacing plate.

4. The linear motor as claimed in claim 1, wherein the surface of coil portion toward the spacing plate defines a plurality of receive holes, and each of the plurality of the balls is partially received in the corresponding receive hole.

5. The linear motor as claimed in claim 4, wherein the receive holes are integrally formed with the coil portion.

6. The linear motor as claimed in claim 5, wherein the coil portion is made of epoxy resin.

7. The linear motor as claimed in claim 1, wherein the balls are spherical.

8. The linear motor as claimed in claim 1, wherein the balls are substantially cylinder shaped.

9. The linear motor as claimed in claim 1, wherein the balls are evenly spaced from each other.

10. The linear motor as claimed in claim 1, wherein the two plates are flat plates, and the spacing plate is a strip shaped plate.

* * * * *